(12) United States Patent
Dea

(10) Patent No.: US 12,489,469 B2
(45) Date of Patent: Dec. 2, 2025

(54) HIGH EFFICIENCY NON-PULSE WIDTH MODULATION COMMUNICATIONS SYSTEM AND METHOD

(71) Applicant: United States of America as represented by the Secretary of the Navy, San Diego, CA (US)

(72) Inventor: Jack Yuen Dea, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 443 days.

(21) Appl. No.: 18/302,324

(22) Filed: Apr. 18, 2023

(65) Prior Publication Data

US 2024/0356569 A1  Oct. 24, 2024

(51) Int. Cl.
*H04B 1/00* (2006.01)
*H04B 1/10* (2006.01)

(52) U.S. Cl.
CPC .............. *H04B 1/0042* (2013.01); *H04B 1/10* (2013.01)

(58) Field of Classification Search
CPC .. H03F 2200/372; H03F 3/217; H03F 1/3264; H03F 1/26; H03F 2200/03; H04B 1/04; H04B 1/0483; H04B 1/0475; H04B 2203/545; H04B 2203/5441; H04B 1/38; H04B 1/3827; H04B 1/0042; H04B 1/10; H04B 2001/045

See application file for complete search history.

(56) References Cited

U.S. PATENT DOCUMENTS

| | | | |
|---|---|---|---|
| 4,115,742 A | 9/1978 | Yokoyama | |
| 7,343,015 B2 * | 3/2008 | Lam | H04B 1/04 |
| 10,757,506 B2 * | 8/2020 | Chang | H03F 3/2173 |
| 2007/0149112 A1 * | 6/2007 | Latour | H04H 20/02 |
| | | | 455/3.06 |
| 2009/0270056 A1 * | 10/2009 | Singerl | H03F 1/02 |
| | | | 455/127.1 |
| 2012/0063505 A1 * | 3/2012 | Okamura | H04B 5/79 |
| 2018/0076837 A1 * | 3/2018 | Torre | H04B 1/18 |
| 2021/0288680 A1 * | 9/2021 | Takahashi | H03F 3/217 |
| 2022/0052713 A1 * | 2/2022 | Kitajima | H04B 1/04 |

FOREIGN PATENT DOCUMENTS

| | | | | |
|---|---|---|---|---|
| CN | 110677775 A | * | 1/2020 | H03F 3/20 |
| EP | 2575309 A1 | * | 4/2013 | H04B 10/524 |

OTHER PUBLICATIONS

Max Carter, "A 200-Watt Push-Pull Class-E AM Transmitter for 1710 KHz", www.maxcarter.com/classexmtr/circuitdescription.php.
"The RF amplifier: circuit values, MOSFET ratings and operational conditions", www.classeradio.com/rfvalues.htm.
"FQA28N15 N-Channel QFET Mosfet", Data Sheet, Fairchild Semiconductor, Jun. 2014.

(Continued)

*Primary Examiner* — Lana N Le
(74) *Attorney, Agent, or Firm* — Naval Information Warfare Center Pacific; Kyle Eppele; Paul Oestreich

(57) ABSTRACT

The system and method of the present invention provide power efficient, high fidelity non-PWM communications of audio signals for reception by a modulating AM receiver at various useful frequency bands, or loud speaker transmission using sound waves.

29 Claims, 9 Drawing Sheets

(56) References Cited

OTHER PUBLICATIONS

"FQA36P15 150V P-Channel MOSFET", Data Sheet, Fairchild Semiconductor, Dec. 2003.
"2.4: Amplifier Efficiency", Engineering LibreTexts, https://eng.libretexts.org/Bookshelves/Electrical_Engineering/.
"MOSFET", http://en.wikipedia.org/w/index.php?oldid=516623279.
Nathan O. Sokal, "Class-E RF Power Amplifiers", QEX, Jan./Feb. 2001, pp. 9-20.
"Power amplifier classes", Wikipedia, https://en.wikipedia.org/wiki/Power_amplifier_classes.

\* cited by examiner

HIGH EFFICIENCY NON-PULSE WIDTH MODULATION COMMUNICATIONS SYSTEM AND METHOD

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice: (619) 553-5118; email: NIWC_Pacific_T2@navy.mil. Reference Navy Case Number 105808.

BACKGROUND OF THE INVENTION

Field of the Invention: The present invention relates generally to amplitude modulated (AM) broadcast communications systems. More particularly, the present invention relates to systems and methods for high efficiency transmission of AM broadcast signals without using pulse width modulation techniques.

Description of Related Art: Most commercial broadcasters use Class A amplifiers. FIG. 1 is a high-level circuit diagram of a conventional Class A broadcast system 100. As shown in FIG. 1, input audio signal 102 is used to audio modulate (AM) a sinusoidal radio frequency (RF) source 104 to generate an audio modulated signal 106 input to a Class A amplifier 110 which in turn drives the amplified AM signal 108 through an antenna 112 and thereby broadcasting a good AM signal, shown generally at arrow 114, for reception by the antenna 112 of an AM receiver 116. Such conventional Class A broadcast systems 100 provide good signal quality because they are typically biased to operate in the center of the linear region of the Class A amplifier 110, not allowed to saturate at either extreme and thus have very low harmonic distortion. However, Class A amplifier designs are notoriously inefficient power amplifiers. The typical Class A amplifier has both output stages constantly on at full power and essentially acts as a variable resistor incurring large losses. Because both output stages are constantly on, Class A is considered to be the least efficient of power amplifier designs, with an average efficiency of about 20% (50% at best, theoretically).

Class B amplifiers are capable of higher efficiency than Class A (78.5% at best, theoretically), but suffer from cross-over distortion and thus do not deliver good AM signals for reception. Accordingly, Class AB amplifiers have been developed to overcome and eliminate the low power efficiency disadvantage of Class A amplifiers and the signal distortion in Class B amplifiers. Class AB amplifiers generally have power efficiency around 50% and as high as 65%. However, Class AB amplifiers generally require complex circuitry and are still less efficient than Class B amplifiers.

Class C amplifiers have efficiency of approximately 80%. Class C amplifiers are ideal for radio frequency oscillators, but are not used for AM transmission, or audio applications generally, because they suffer from large signal distortion and narrow operating bandwidth.

Class D switching amplifiers employ a square wave signal to control the full on or off (switch mode) of two metal oxide semiconductor field effect transistors (MOSFETs) one of which is N-type and the other P-Type. The main advantage of a Class D amplifier is power efficiency. Efficiency over 90% is achievable with MOSFETS and >80% power efficiency is quite common. The most common type of modulation is pulse width modulation (PWM) where audio information is used to control the width of the on and off pulses. A positive power source and a negative power source are used with the Class D amplifier. Class D amplifiers are typically used for audio amplifiers. However, the PWM scheme cannot be used for radio broadcasts to an AM receiver.

Class E amplifiers are highly efficient tuned switching power amplifiers used at RF signal speeds. Class E amplifiers can achieve power efficiency >90%. The Class E amplifier includes a single-pole switching element, typically a single N-Type MOSFET and a tuned reactive network between the switch and the load. The Class E amplifier achieves high power efficiency by only operating the switching element at points of zero current (on to off switching) or zero voltage (off to on switching) which minimizes power lost in the switch, even when the switching time of the devices is long compared to the frequency of operation. Various modulation schemes are possible with Class E amplifiers, but PWM is generally preferred. As with Class D, the PWM scheme employed with a Class E amplifier cannot be used for radio broadcasts to an AM receiver.

In view of the foregoing, there exists a need in the art for AM signal broadcasting with high power efficiency, low signal distortion and without requiring complex circuitry.

SUMMARY OF THE INVENTION

The system and method of the present invention provide power efficient, high fidelity non-PWM communications of audio signals for reception by a modulating AM receiver at various useful frequency bands, or for loud speaker transmission using sound waves.

An embodiment of a high fidelity non-PWM communications system for audio signal transmission is disclosed. The embodiment of a communications system may include a radio frequency (RF) source for generating a carrier signal. The embodiment of a communications system may further include a first switching amplifier configured to receive the carrier signal and generate an amplified carrier signal. The embodiment of a communications system may include a phase-shifter configured to receive the carrier signal and an input audio signal, the phase-shifter further configured to phase-shift the carrier signal by the audio signal. The embodiment of a communications system may include a second switching amplifier configured to amplify the audio phase-shifted carrier signal received from the phase-shifter. The embodiment of a communications system may include a RF low pass filter configured to pass a combination of the amplified carrier signal and the audio phase-shifted carrier signal as an output audio modulated RF signal.

An embodiment of a method for transmitting a high fidelity non-PWM audio signal is disclosed. The method embodiment may include providing a high fidelity non-PWM communications system for audio signal transmission configured to receive an input audio signal and provide an output audio modulated RF signal. The method embodiment may further include amplifying the carrier signal to obtain an amplified carrier signal. The method embodiment may further include phase-shifting the carrier signal to obtain a phase-shifted carrier signal. The method embodiment may further include modulating 808 the phase-shifted carrier signal with the input audio signal to obtain an input audio signal modulated phase-shifted carrier signal. The method embodiment may further include amplifying the input audio signal modulated phase-shifted carrier signal to obtain an amplified input audio signal modulated phase-shifted carrier signal. The method embodiment may further include combining the amplified carrier signal with the amplified input audio signal modulated phase-shifted carrier signal to obtain a net interference current that is an output audio modulated RF signal. The method embodiment may further include transmitting the output audio modulated RF signal.

Additional features and advantages of the invention will be apparent from the detailed description which follows, taken in conjunction with the accompanying drawings, which together illustrate, by way of example, features of embodiments of the present invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless specifically otherwise stated.

Embodiments of the present invention include high efficiency, high fidelity, non-pulse width modulation communications transmitters, systems and methods for amplitude modulation broadcasting and audio signal amplification. The inventive systems and methods disclosed herein are useful for broadcasting output audio modulated RF signals using switching amplifiers.

Figure 2:
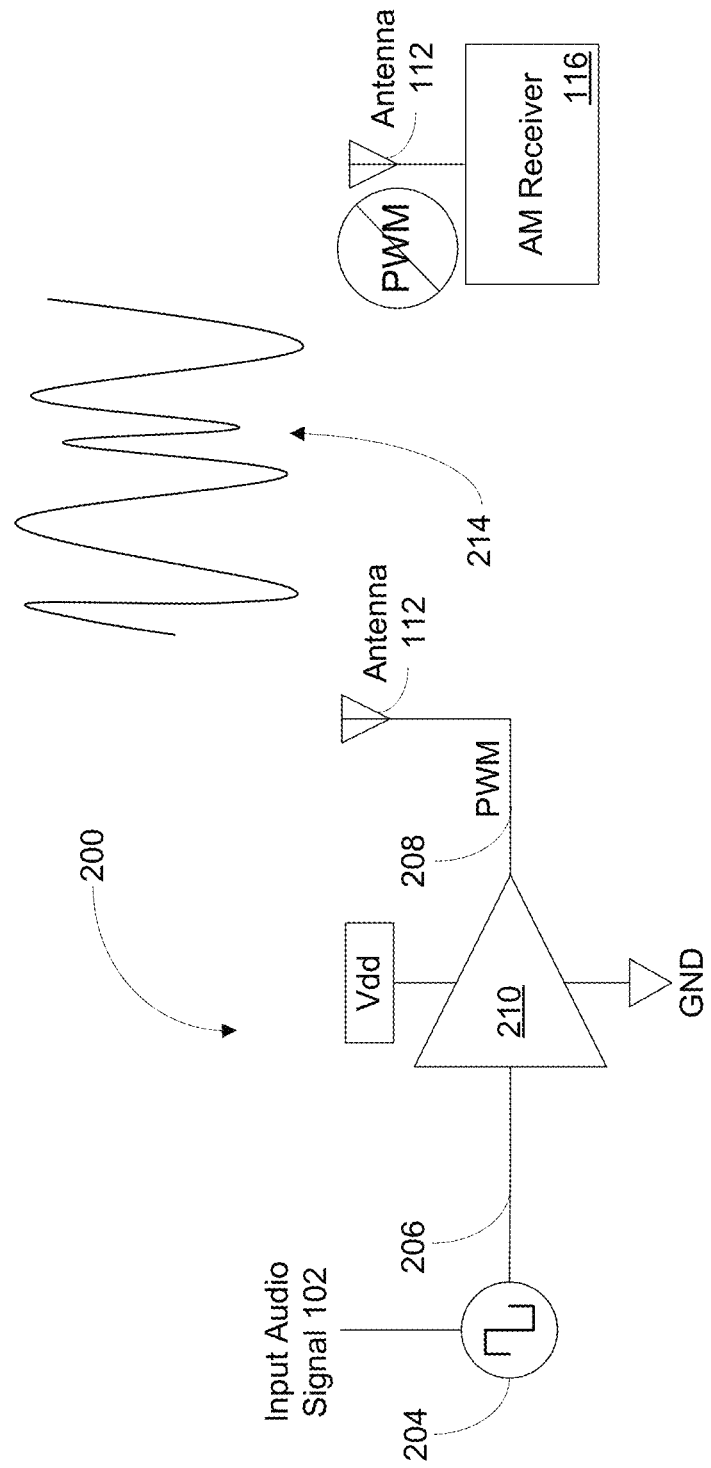
FIG. 2 is a high-level circuit diagram of a Class D/E amplifier broadcast system, according to the present invention.

FIG. 2 is a high-level circuit diagram of an embodiment of a pulse width modulation (PMW) amplifier broadcast system 200. The configuration of system 200 is similar in configuration to system 100. However, instead of employing a sinusoidal RF source 104, a square wave RF source 204 is modulated by the input audio signal 102 to provide an audio modulated RF signal 206. Additionally, the Class A amplifier 110 has been substituted with either a Class D or Class E amplifier referred to herein collectively as a Class D/E amplifier 210. The output of Class D/E amplifier 210 is a pulse width modulated (PWM) signal 208 which may be broadcast via antenna 112 as a PWM output signal shown generally at arrow 214 for reception by an AM receiver 116 with its own antenna 112. The Class D/E amplifier 210 during its "on" pulse, opens up fully to the power supply and incurs relatively small power losses due to resistance heating. Thus, using a Class D/E amplifier 210 is power efficient, e.g., power efficiency is typically 90%. However, the PWM output signal 214 will be unintelligible to a conventional AM receiver 116 as explained with reference to FIG. 3.

Figure 3:
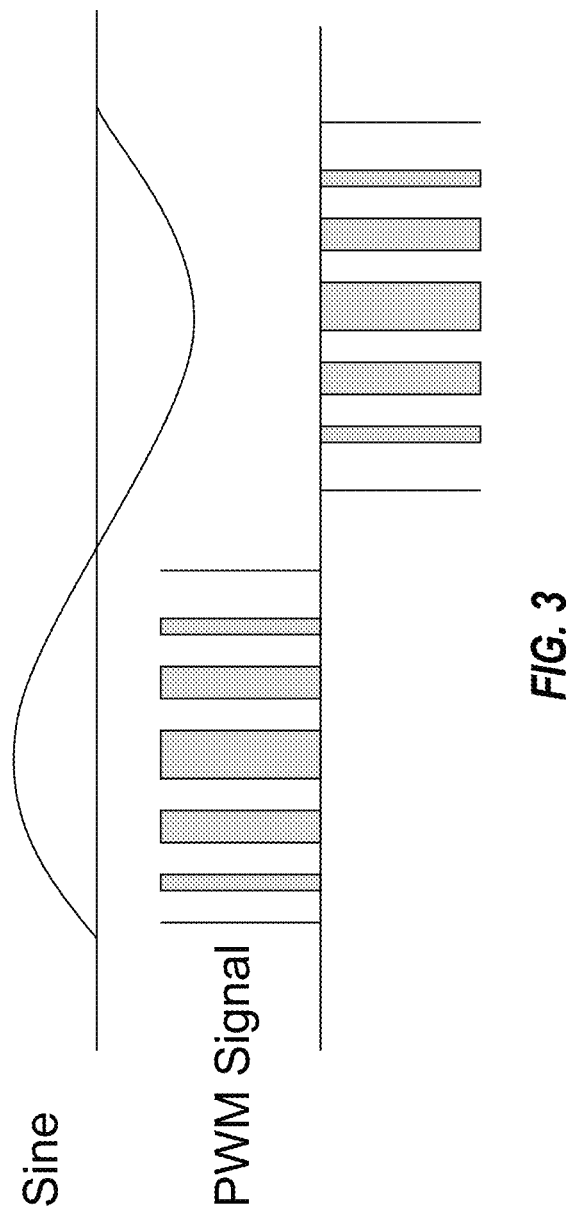
FIG. 3 illustrates an exemplary sinusoidal signal converted to a PWM signal.

FIG. 3 illustrates an exemplary sinusoidal signal converted to a PWM signal. The variable width of the PWM pulses indicates that the PWM signal has variable frequencies. Accordingly, the output signal 208 of a Class D/E amplifier 210 would drive antenna 112 into a multi-frequency PWM broadcast signal 214. It will be understood, however, that such a multi-frequency PWM signal 214 will be unintelligible when picked up by a conventional AM receiver which is tuned to the carrier frequency of the radio RF signal generator 104 (hence the PWM in a slashed circle shown in FIG. 2).

Figure 4:
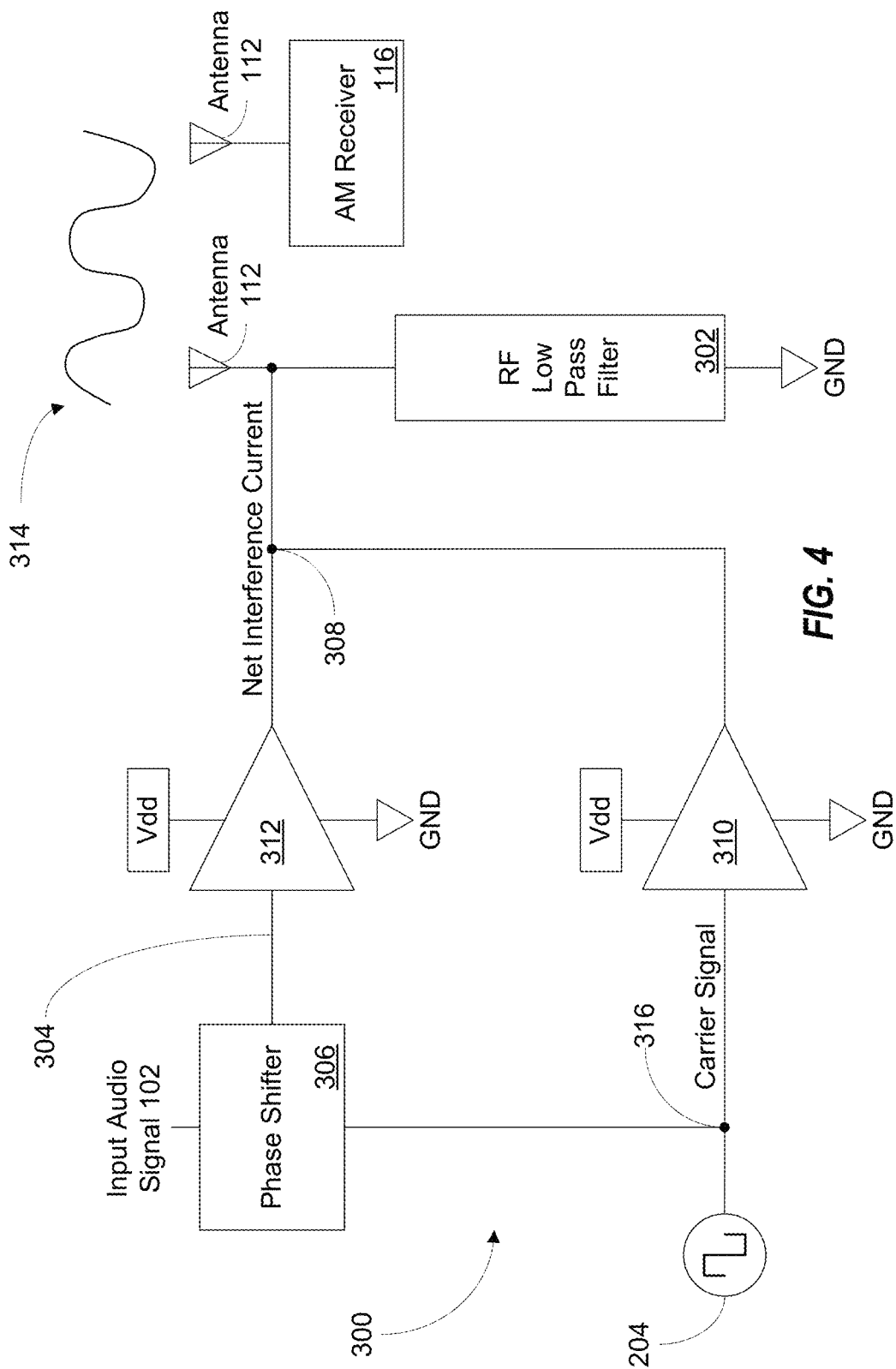
FIG. 4 is a high-level circuit diagram of a high fidelity non-pulse width modulation communications system, according to the present invention.

FIG. 4 is a high-level circuit diagram of a high fidelity non-pulse width modulation communications system 300, according to the present invention. As shown in FIG. 4, system 300 incorporates two switching amplifiers 310 and 312. First switching amplifier 310 is switched directly by the square wave RF carrier source 204 and its carrier signal 316. Second switching amplifier 312 is switched by an audio phase-shifted carrier signal 304. More particularly, the audio phase-shifted carrier signal 304 is the carrier frequency signal 316 phase-shifted 306 by the input audio signal 102. The currents from both switching amplifiers 310 and 312 are combined at node 308 before reaching the antenna 112. The net interference current at node 308, also referred to herein as the output audio modulated RF signal 308, reaching the antenna 112 will be modulated at the audio frequency because of second switching amplifier 312.

According to the illustrated embodiment, a RF low pass filter 308 may also be provided at the node 308 feeding the antenna 112. The purpose for RF low pass filter 308 is to remove higher order harmonics prior to broadcast 314. The broadcast AM signal 314 generated by system 300 is intelligible with high fidelity to a conventional AM receiver 116 with its antenna 112, has high power efficiency and incorporates a relatively compact circuit design. Having described system 300 at a high-level, additional detailed description, particularly with emphasis on the first 310 and second 312 switching amplifiers, will now be detailed. Exemplary switching amplifier circuits suitable for use as first 310 and second 312 switching amplifiers are shown in FIGS. 5 and 6 along with related description herein.

Figure 5:
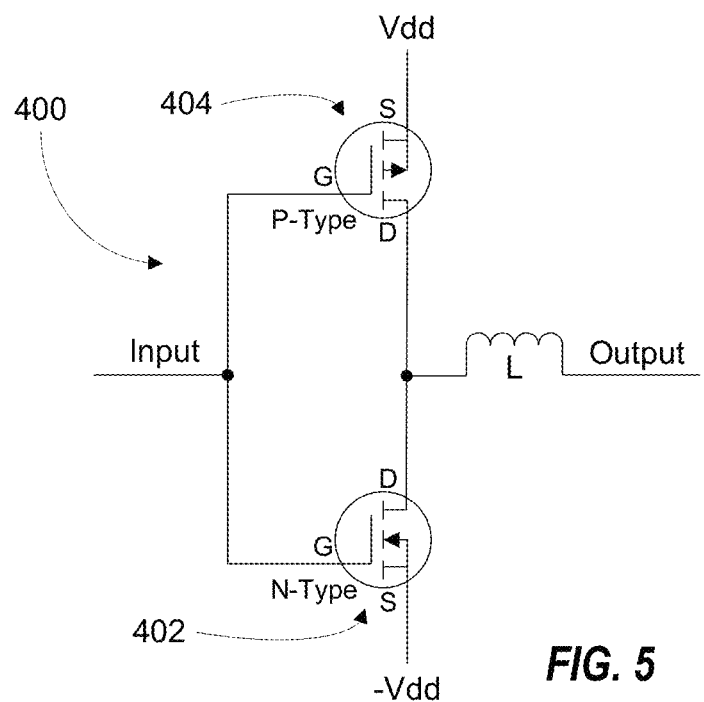
FIG. 5 is circuit diagram of a matched dual transistor amplifier circuit configured for use in a particular embodiment of a high fidelity non-pulse width modulation communications system, according to the present invention.
Figure 6:
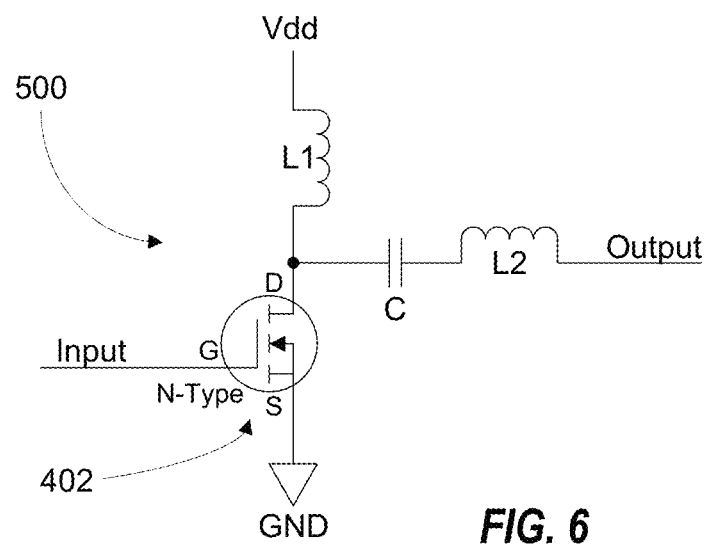
FIG. 6 is a circuit diagram of a single transistor amplifier circuit configured for use in a particular embodiment of a high fidelity, high power efficiency, non-pulse width modulation communications system, according to the present invention.

FIG. 5 is circuit diagram of a matched dual transistor amplifier circuit 400 configured for use in a particular embodiment of a high fidelity, high power efficiency, non-pulse width modulation communications system 300, according to the present invention. According to a Class D embodiment of system 300, both first 310 and second 312 switching amplifiers may each be realized using circuit 400. As shown in FIG. 5, the embodiment of amplifier circuit 400 may include matched power transistors, namely, a P-Type enhancement mode metal oxide semiconductor field effect transistor (MOSFET) 404 and an N-Type enhancement mode MOSFET 402 and an inductor. It will be understood by one of ordinary skill in the art that any suitably matched power transistors may be used to construct circuit 400. The term "matched" as used herein refers to similar or identical current, voltage and speed characteristics of the N- and P-Type MOSFETs 402 and 404, as understood by one of ordinary skill in the art. According to a particular embodiment of circuit 400, N-Type MOSFET 402 may be Part No. FQA28N15 and P-Type MOSFET 404 may be Part No. FQA36P15, both available from Onsemi, 5701 North Pima Road, Scottsdale, AZ 85250.

According to the illustrated embodiment of circuit 400 shown in FIG. 5, an input signal may be connected to the gate G of each MOSFET 402 and 404. The input signal may be a carrier signal 316 or an audio modulated phase-shifted carrier signal 304 depending on whether circuit 400 is instantiated as the first 310 or the second 312 switching amplifier of system 300. According to the illustrated embodiment of circuit 400, the drain D of MOSFET 404 may be connected to a first end of inductor L and source S is connected power Vdd. According to the illustrated embodiment of circuit 400, the drain D of MOSFET 402 is also connected to the first end of inductor L and source S tied to low voltage-Vdd. According to the illustrated embodiment of circuit 400, the second end of inductor L drives the output signal. The output signal of circuit 400, when incorporated in system 300, is the output audio modulated RF signal of the Class D embodiment of system 300 at node 308 (FIG. 4) from both first 310 and second 312 switching amplifiers.

The Class D broadcast system 300 employing the matched dual transistor amplifier circuit 400 shown in FIG. 5 may be capable of utilizing any frequency from very low frequency (VLF), e.g., tens of KHz, to high frequency, HF, e.g., tens of MHz, to very high frequency, e.g., hundreds of MHz. It will further be understood by one of ordinary skill in the art that amplifier circuit 400 may further include additional output circuitry not shown for example, and without limitation, a capacitor in parallel with the load (antenna 112) for LC network tuning or low pass filtering of the output audio modulated RF signal. However, such additional circuitry is not required.

FIG. 6 is a circuit diagram of a single transistor amplifier circuit 500 configured for use in another embodiment of a high fidelity, high power efficiency, non-pulse width modulation communications system 300, according to the present invention. According to a Class E embodiment of system 300, both first 310 and second 312 switching amplifiers may each be realized using circuit 500. As shown in FIG. 6, the embodiment of amplifier circuit 500 may include N-Type enhancement mode MOSFET 402, a capacitor, C, a first inductor, L1, and a second inductor, L2. According to a particular embodiment of circuit 500, N-Type MOSFET 402 may be Part No. FQA28N15 available from Onsemi, 5701 North Pima Road, Scottsdale, AZ 85250. Transistor matching is unnecessary in the single transistor amplifier circuit 500 embodiment of system 300 as each amplifier circuit 500 only includes a single N-type MOSFET 402.

According to the illustrated embodiment of circuit 500 shown in FIG. 6, an input signal may be connected to the gate, G, of MOSFET 402 with source, S, tied to ground, GND, and drain, D, connected to a first end of capacitor, C. According to the illustrated embodiment of circuit 500, the first inductor, L1, may further be connected between power, Vdd, and the drain, D, of MOSFET 402. According to the illustrated embodiment of circuit 500, the second inductor, L2, may further be connected between the second end of capacitor, C, and the output signal. Thus, the output signal of circuit 500 will drive the output audio modulated RF signal of the Class E embodiment of system 300 at node 308 (FIG. 4) from the first 310 and second 312 switching amplifier which combined generate a net interference current that defines the output audio modulated RF signal. The modified Class E broadcast system 300 employing the single transistor amplifier circuit 500 shown in FIG. 6 may requires more impedance matching to the load, relative to the modified Class D system. This is because Class D systems generally employ a broader frequency scheme. Modified Class E amplifier impedance matching may be achieved through careful selection and tuning of the capacitors C and inductors L1 and L2 for each N-Type MOSFET 402, as is known to those of ordinary skill in the art.

Referring again to FIG. 4, phase-shifter 306 may be any suitable electronic means adapted for shifting the phase of the carrier signal 316 by the input audio signal 102 to generate an audio phase-shifted carrier signal 304. For example and not by way of limitation, a digital phase-shifter, a general RC phase-shifter, or a more particular variation of an RC phase-shifter, where C is a varactor and/or R is a transistor (allowing the phase-shifter to follow the audio frequency) are all suitable approaches for implementing phase-shifter 306. It will be understood that one of ordinary skill in the art will be familiar with such particular embodiments and component specifications of a phase-shifter 306 suitable for use with system 300 of the present invention and accordingly, such phase-shifter embodiments will not be further elaborated herein.

Figure 7:
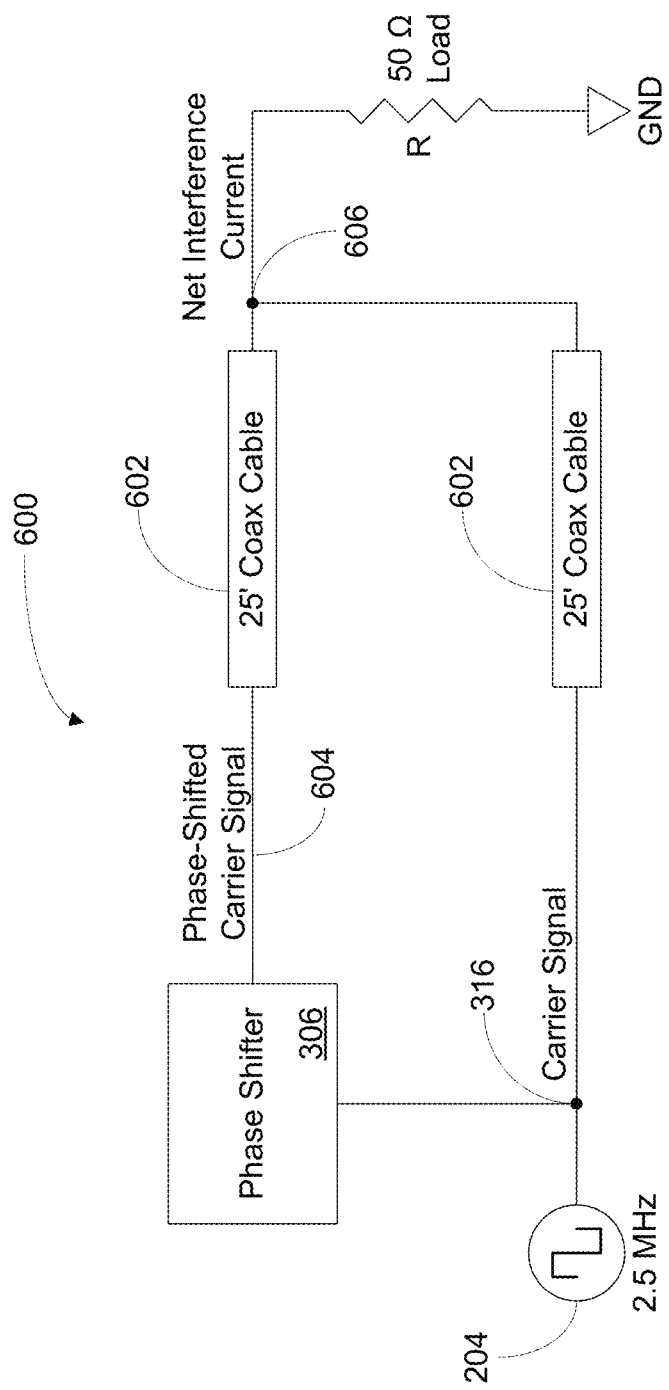
FIG. 7 is test circuit constructed for proof of concept of combining the outputs of the first and second switching amplifiers employed in the system illustrated in FIG. 4.

FIG. 7 is test circuit 600 constructed for proof of concept of combining the outputs of the first 310 and second 312 switching amplifiers employed in the embodiment of a communications system 300 (FIG. 4), according to the present invention. The embodiment of test circuit 600 shown in FIG. 7 may include a square wave RF source 204 generating a carrier signal 316 (e.g., operating at 2.5 MHZ) in communication with a phase-shifter 306 configured to generate a phase-shifted carrier signal 604. The embodiment of test circuit 600 may further include two coaxial (coax) cables 602, one configured for carrying the carrier signal 316 and the other configured for carrying the phase-shifted carrier signal 604 the outputs of both of which are tied together to generate a net interference current at node 606. In the illustrated embodiment of test circuit 600, each Coax cable is about 25' in length. According to the illustrated test circuit 600, an antenna 112 (see FIGS. 1-2 and 4) may be modeled as a resistive load, R. An exemplary resistive load, R=50Ω may be used to simulate the 50Ω impedance of antenna 112. By applying various phase-shifts to the carrier signal 316, the net interference current 606 can be measure as further described with reference to FIG. 8.

Figure 8:
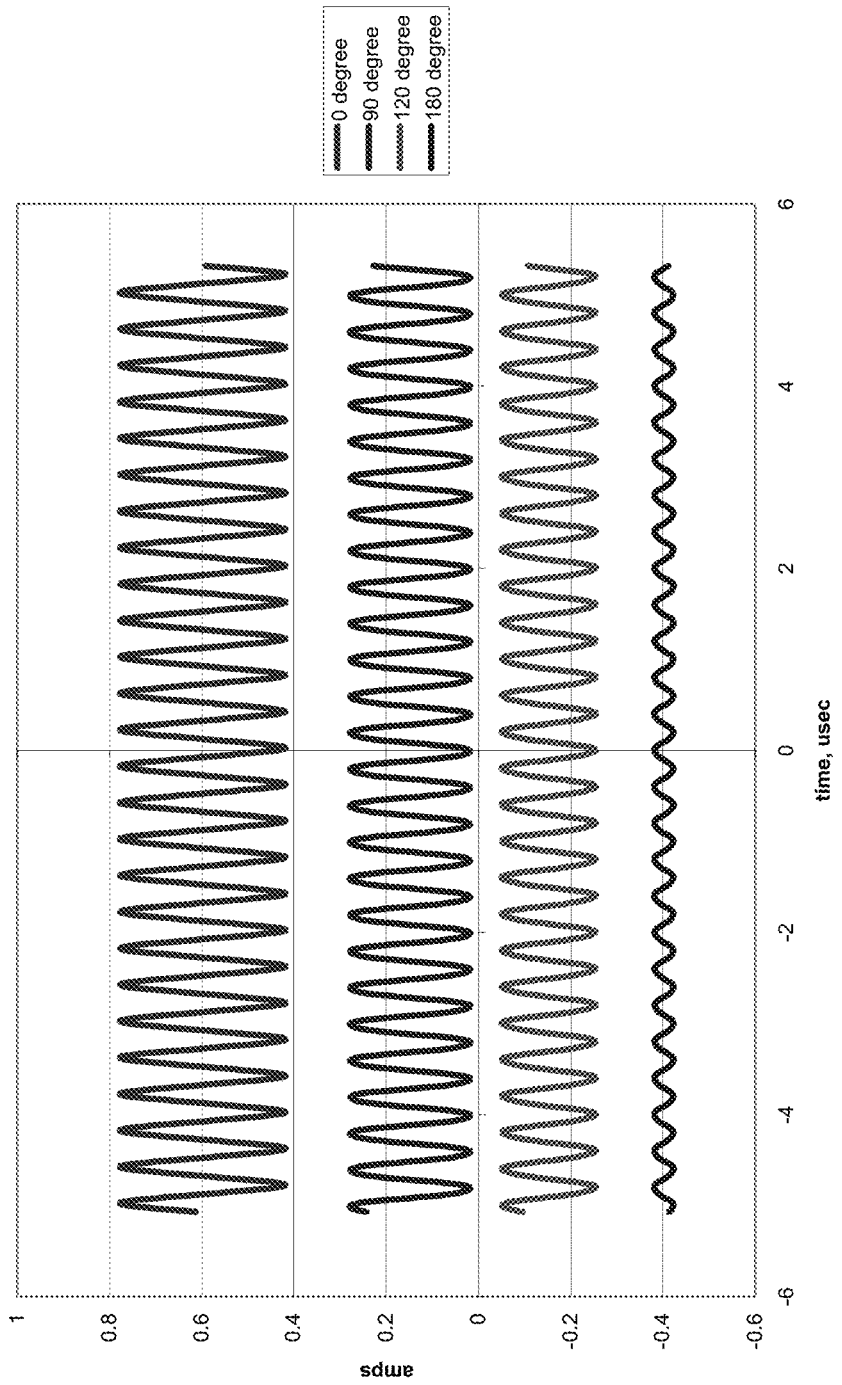
FIG. 8 is a graph illustrating the interference current generated by combining the outputs from an amplified carrier signal and its phase-shifted counterpart at various degrees of phase shift using the test circuit illustrated in FIG. 7, according to the present invention.

FIG. 8 is a graph 700 illustrating the interference current generated by combining the outputs from an amplified carrier signal and its phase-shifted counterpart at various degrees of phase shift over time using the test circuit 600 shown in FIG. 7, according to the present invention. More particularly, FIG. 8 illustrates the net interference current 606 measured when operating the RF source at 2.5 MHz of test circuit 600 and adjusting the phase-shift 316 to 0°, 90°, 120° and 180°. As shown in FIG. 8, the currents add when in phase and subtract when out of phase. More particularly, the net current decreases with increasing phase, up to minimal current at 180 degrees. Thus, FIG. 8 provides a visual confirmation of the how the outputs from an amplified carrier signal and its phase-shifted counterpart will combine.

Figure 9:
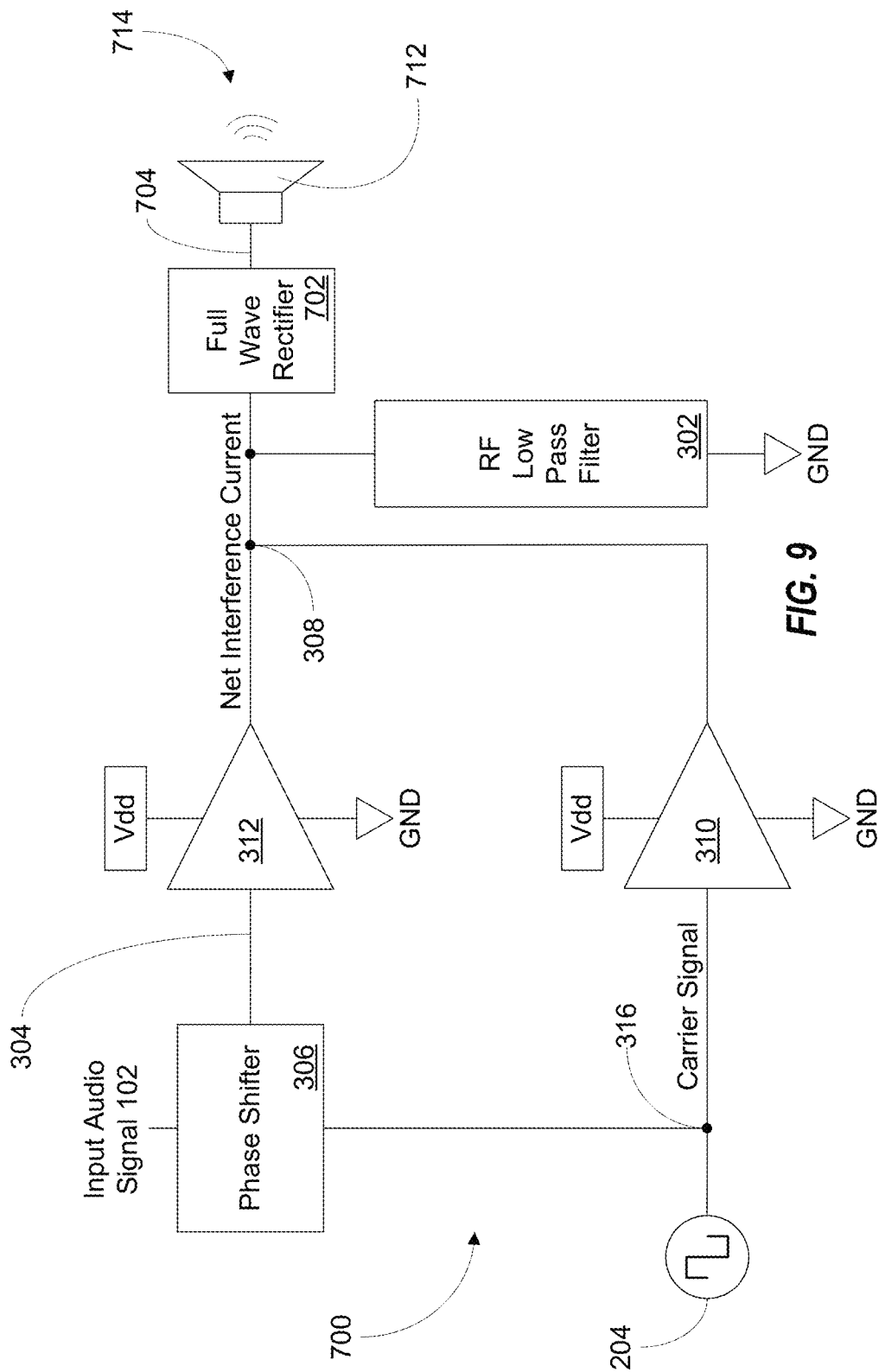
FIG. 9 is a high-level circuit diagram of an embodiment of a high fidelity non-pulse width modulation speaker system, according to the present invention.

It will further be understood that the present invention is not limited to output audio modulated RF transmission to an AM receiver 116 as depicted in FIG. 4. FIG. 9 is a high-level circuit diagram of an embodiment of a high fidelity non-PWM speaker system 700, according to the present invention. System 700 is essentially the same as high fidelity non-PWM communications system 300 except that instead of driving a broadcast antenna 112, the net interference current 308 is used to drive a full wave rectifier 702 in series with a loud speaker 712. The full wave rectifier 702 rectifies the output audio modulated RF signal and then forms an envelope signal which in turn is the audio signal 704 used to drive the speaker 712. The sound waves 714 generated by the loud speaker 712 provide a high fidelity audio reproduction of the input audio signal 102. It will also be understood that the stiffness of the coil (not shown) in speaker 712 may act as a low pass filter, therefore obviating the need for RF low pass filter 302.

Figure 10:
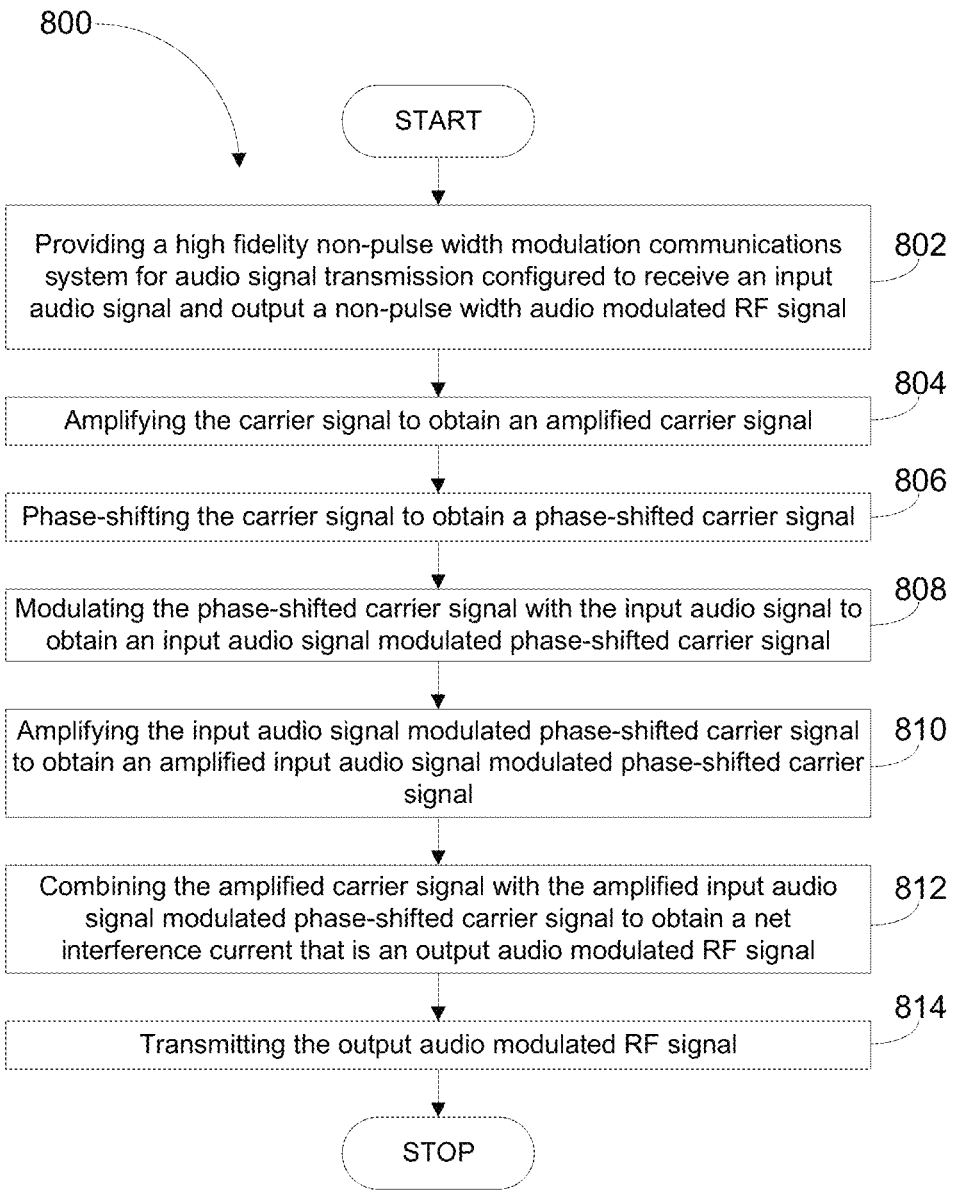
FIG. 10 is a flowchart of an embodiment of a method for transmitting a high fidelity non-pulse width modulated audio signal.

FIG. 10 is a flowchart of an embodiment of a method 800 for transmitting a high fidelity non-pulse width modulated audio signal, according to the present invention. The embodiment of a method 800 may include providing 802 a high fidelity non-pulse width modulation communications system for audio signal transmission configured to receive an input audio signal and output the high fidelity non-pulse width modulated audio signal. According to particular embodiments of method 800, the high fidelity non-pulse width modulation communications system may be system 300 and its variants disclosed herein. The embodiment of a method 800 may further include amplifying 804 the carrier signal to obtain an amplified carrier signal. According to a particular embodiment of method 800, amplifying 804 the carrier signal may be performed by first switching amplifier 310 as described herein. According further embodiments of method 800, first switching amplifier 310 may be a matched dual transistor amplifier circuit 400 or a single transistor amplifier circuit 500, depending on whether modified Class D or Class E, respectively, is desired.

The embodiment of a method 800 may further include phase-shifting 806 the carrier signal to obtain a phase-shifted carrier signal. The embodiment of a method 800 may further include modulating 808 the phase-shifted carrier signal with the input audio signal to obtain an input audio signal modulated phase-shifted carrier signal. According to various embodiments of method 800, phase-shifting 806 and modulating 808 may be implemented using a phase-shifter 306 and its various alternative implementations as described herein.

The embodiment of a method 800 may further include amplifying 810 the input audio signal modulated phase-shifted carrier signal to obtain an amplified input audio signal modulated phase-shifted carrier signal. According to a particular embodiment of method 800, amplifying 810 the input audio signal modulated phase-shifted carrier signal to obtain an amplified input audio signal modulated phase-shifted carrier signal may be performed by second switching amplifier 312 as described herein. According further embodiments of method 800, second switching amplifier 312 may be a matched dual transistor amplifier circuit 400 or a single transistor amplifier circuit 500, depending on whether modified Class D or Class E, respectively, is desired.

The embodiment of a method 800 may further include combining 812 the amplified carrier signal with the amplified input audio signal modulated phase-shifted carrier signal to obtain a net interference current that is an amplified audio modulated output signal. The embodiment of a method 800 may further include transmitting 814 the audio modulated output signal. According to a particular embodiment of method 800, transmitting 814 the audio modulated output signal may be achieved using an antenna 112 as described herein.

Having disclosed particular embodiments of the high efficiency, non-PWM communications system and method with reference to the drawing FIGS., additional generic embodiments of the present invention will now be described.

A high fidelity non-pulse width modulation communications system for audio signal transmission is disclosed. The embodiment of a communications system may include a radio frequency (RF) source for generating a carrier signal. The embodiment of a communications system may further include a first switching amplifier configured to receive the carrier signal and generate an amplified carrier signal. The embodiment of a communications system may include a phase-shifter configured to receive the carrier signal and an input audio signal, the phase-shifter further configured to phase-shift the carrier signal by the audio signal. The embodiment of a communications system may include a second switching amplifier configured to amplify the audio phase-shifted carrier signal received from the phase-shifter. The embodiment of a communications system may include a RF low pass filter configured to pass a combination of the amplified carrier signal and the audio phase-shifted carrier signal as an output audio modulated RF signal. A particular embodiment of the communications system may be system 300 configured as shown in FIG. 4 and described herein.

Figure 1:
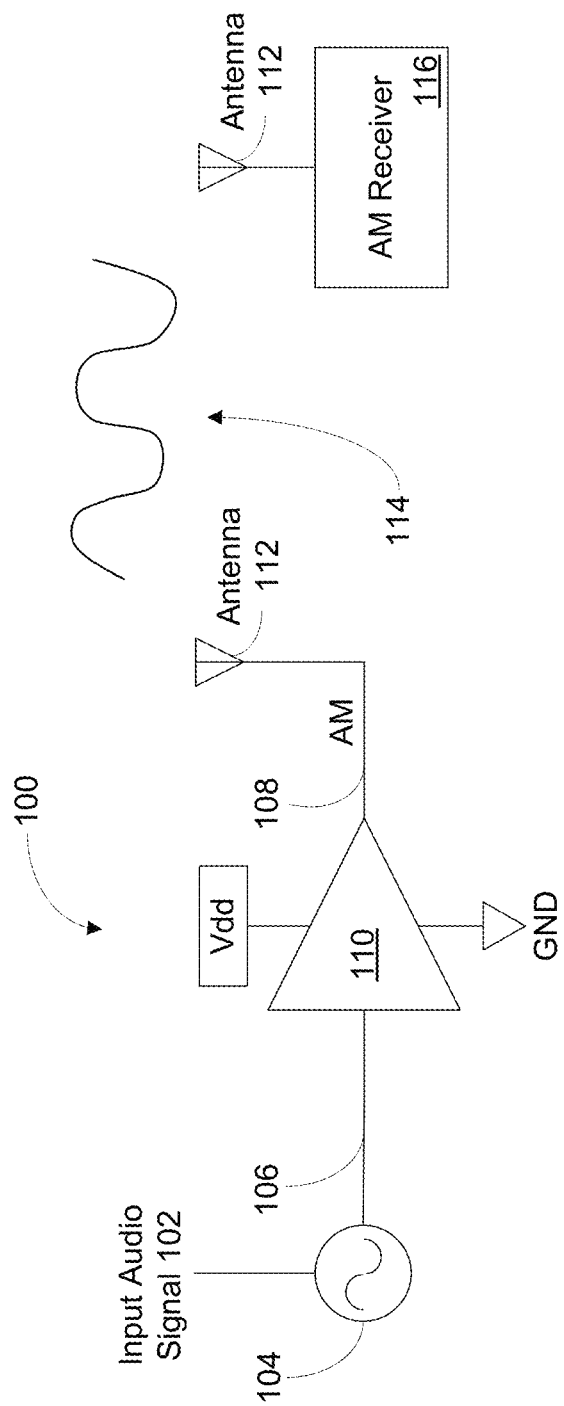
FIG. 1 is a circuit diagram of a conventional Class A amplifier AM broadcast system.

According to another embodiment, the communications system may further include an antenna configured for transmitting the output audio modulated RF signal. A particular embodiment of an antenna configured for transmitting the output audio modulated RF signal may be antenna 112 as shown in FIGS. 1, 2 and 4 and described herein. According to yet another embodiment, the communications system may further include an amplitude modulating receiver configured for receiving the output audio modulated RF signal. According to still another embodiment, the communications system may further include a full wave rectifier in communication with a speaker configured for transmitting the output audio modulated RF signal as sound waves. This embodiment of a communications system with a full wave rectifier and speaker may include further circuitry used to demodulate and condition an amplitude modulated signal prior to generating sound waves as a high-fidelity reproduction of the input audio signal. It will be understood that one of ordinary skill in the art will be familiar with and understand such circuitry and techniques for converting an output audio modulated RF signal into sound wave emanating from a loud speaker and thus will not be further elaborated herein.

According to another embodiment of the communications system each of the first and the second switching amplifiers may be matched dual transistor amplifier circuits. According to a particular embodiment, "matched" dual transistor amplifier circuits are matched N- and P-type MOSFET transistors with identical or similar current voltage and speed characteristics.

According to a Class D embodiment of the communications system, the first switching amplifier may further include an inductor L with a first end and a second end. The second end of inductor L may be connected to the output audio modulated RF signal. This Class D embodiment of a first switching amplifier may further include a P-type enhancement mode MOSFET having gate G in communication with the carrier signal received from the RF source, a source S connected to power, Vdd, and drain D connected to the first end of inductor L. This embodiment of a first switching amplifier may further include an N-type enhancement mode MOSFET having a gate G in communication with the carrier signal, a drain D connected to the first end of inductor L, and a source S connected to negative power, −Vdd. A particular embodiment of a first switching amplifier 310 (FIG. 4) may include the dual transistor amplifier circuit 400 (FIG. 5) as described herein.

According to the Class D embodiment of the communications system, the second switching amplifier may further include an inductor L with a first end and a second end. The second end of inductor L may be connected to the output audio modulated RF signal. This embodiment of a second switching amplifier may further include a P-type enhancement mode MOSFET having a gate G in communication with the audio phase-shifted carrier signal from the phase-shifter, a source S connected to power, Vdd, and a drain D connected to the first end of inductor L. This embodiment of a second switching amplifier may further include an N-type enhancement mode MOSFET having a gate G in communication with the audio phase-shifted carrier signal from the phase-shifter, a drain D connected to the first end of inductor L, and a source S connected to negative power, −Vdd. A particular embodiment of the second switching amplifier 312 (FIG. 4) may include the dual transistor amplifier circuit 400 (FIG. 5) as described herein.

According to a Class E embodiment of a communications system, the first switching amplifier may include a first inductor L1 with its first end connected to power, Vdd. This embodiment of a first switching amplifier may further include a capacitor C with its first end connected to a second end of the first inductor L1. This embodiment of a first switching amplifier may further include a second inductor L2 with its first end connected to a second end of the capacitor C and its second end connected to the output audio modulated RF signal. This embodiment of a first switching amplifier may further include an N-type enhancement mode MOSFET having gate G in communication with the carrier signal, a drain D connected to both the second end of the first inductor L1 and the first end of the capacitor. This N-type MOSFET may further include a source S connected to ground, GND.

According to another Class E embodiment of the communications system, the second switching amplifier may include a first inductor L1 with its first end connected to power, Vdd. This embodiment of the second switching amplifier may further include a capacitor C with its first end connected to a second end of the first inductor L1. This embodiment of the second switching amplifier may further include a second inductor L2 with its first end connected to a second end of the capacitor C and its second end connected to the output audio modulated RF signal. This embodiment of the second switching amplifier may further include an N-type enhancement mode MOSFET having a gate G in communication with the audio phase-shifted carrier signal received from the phase-shifter, a drain D connected to both the second end of the first inductor L1 and the first end of the capacitor C. This embodiment of an N-type MOSFET may further include source S connected to ground, GND.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

From the above description of the system and method embodiments for high efficiency non-PWM communications, it is manifest that various alternative structures may be used for implementing features of the present invention without departing from the scope of the claims. The described embodiments are to be considered in all respects as illustrative and not restrictive. It will further be understood that the present invention may suitably comprise, consist of, or consist essentially of the component parts, method steps and limitations disclosed herein. The method and/or apparatus disclosed herein may be practiced in the absence of any element that is not specifically claimed and/or disclosed herein.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A high fidelity non-pulse width modulation communications system for audio signal transmission, comprising:
   a radio frequency (RF) source for generating a carrier signal;
   a first switching amplifier configured to receive the carrier signal and generate an amplified carrier signal, the first switching amplifier further comprising:
      an inductor with a first end and a second end, wherein the second end is connected to the output audio modulated RF signal;
      a P-type enhancement mode, metal oxide field effect transistor (MOSFET) having gate in communication with the carrier signal received from the RF source, a source connected to Vdd and a drain connected to the first end of the inductor; and
      an N-type enhancement mode, MOSFET having gate in communication with the carrier signal, a drain connected to the first end of the inductor and a source connected to −Vdd;
   a phase-shifter configured to receive the carrier signal and an input audio signal, the phase-shifter further configured to phase-shift the carrier signal by the audio signal;
   a second switching amplifier configured to amplify the audio phase-shifted carrier signal received from the phase-shifter; and a RF low pass filter configured to pass a combination of the amplified carrier signal and the audio phase-shifted carrier signal as an output audio modulated RF signal.

2. The communications system according to claim 1, further comprising an antenna configured for transmitting the output audio modulated RF signal.

3. The communications system according to claim 1, further comprising an amplitude modulating receiver configured for receiving the output audio modulated RF signal.

4. The communications system according to claim 1, further comprising a full wave rectifier in series with a speaker configured for transmitting the output audio modulated RF signal as sound waves.

5. The communications system according to claim 1, wherein each of the first and the second switching amplifiers are matched dual transistor amplifier circuits.

6. The communications system according to claim 1, wherein the second switching amplifier further comprises:
  a P-type enhancement mode, metal oxide field effect transistor (MOSFET) having gate in communication with the audio phase-shifted carrier signal received from the phase-shifter, a drain connected to Vdd and source connected to GND;
  an N-type enhancement mode, MOSFET having gate in communication with the audio phase-shifted carrier signal received from the phase-shifter, a drain connected to GND and a source connected to −Vdd;
  a first inductor connected between the P-type MOSFET source and the output audio modulated RF signal; and
  a second inductor connected between the N-type MOSFET source and the output audio modulated RF signal.

7. A method for transmitting a high fidelity non-pulse width audio modulated radio frequency (RF) signal, the method comprising:
  providing a high fidelity non-pulse width modulation communications system for audio signal transmission configured to receive an input audio signal and output the high fidelity non-pulse width modulated audio signal, the system comprising:
    a RF source for generating a carrier signal;
    a first switching amplifier configured to receive the carrier signal and generate an amplified carrier signal, the first switching amplifier further comprising:
      an inductor with a first end and a second end, wherein the second end is connected to the output audio modulated RF signal;
      a P-type enhancement mode, metal oxide field effect transistor (MOSFET) having gate in communication with the carrier signal received from the RF source, a source connected to Vdd and a drain connected to the first end of the inductor; and
      an N-type enhancement mode, MOSFET having gate in communication with the carrier signal, a drain connected to the first end of the inductor and a source connected to −Vdd;
    a phase-shifter configured to receive the carrier signal and an input audio signal, the phase-shifter further configured to phase-shift the carrier signal by the audio signal, outputting an audio phase-shifted carrier signal;
    a second switching amplifier configured to amplify the audio phase-shifted carrier signal;
    a RF low pass filter configured to pass a combination of the amplified carrier signal and the audio phase-shifted carrier signal as an output audio modulated RF signal; and
    an antenna configured for transmitting the output audio modulated RF signal;
  amplifying the carrier signal to obtain an amplified carrier signal;
  phase-shifting the carrier signal to obtain a phase-shifted carrier signal;
  modulating the phase-shifted carrier signal with the input audio signal to obtain an input audio signal modulated phase-shifted carrier signal;
  amplifying the input audio signal modulated phase-shifted carrier signal to obtain an amplified input audio signal modulated phase-shifted carrier signal;
  combining the amplified carrier signal with the amplified input audio signal modulated phase-shifted carrier signal to obtain a net interference current that is an output audio modulated RF signal; and
  transmitting the output audio modulated RF signal.

8. The method according to claim 7, wherein the communications system further comprises an amplitude modulating receiver configured for receiving the output audio modulated RF signal.

9. The method according to claim 7, the antenna is replaced with a full wave rectifier in communication with a speaker configured for transmitting the output audio modulated RF signal as sound waves.

10. The method according to claim 7, wherein each of the first and the second switching amplifiers are matched dual transistor amplifier circuits.

11. The method according to claim 7, wherein the second switching amplifier further comprises:
  a P-type enhancement mode, metal oxide field effect transistor (MOSFET) having gate in communication with the audio phase-shifted carrier signal received from the phase-shifter, a drain connected to Vdd and source connected to GND;
  an N-type enhancement mode, MOSFET having gate in communication with the audio phase-shifted carrier signal received from the phase-shifter, a drain connected to GND and a source connected to −Vdd;
  a first inductor connected between the P-type MOSFET source and the output audio modulated RF signal; and
  a second inductor connected between the N-type MOSFET source and the output audio modulated RF signal.

12. A high fidelity non-pulse width modulation communications system for audio signal transmission, comprising:
  a radio frequency (RF) source for generating a carrier signal;
  a first switching amplifier configured to receive the carrier signal and generate an amplified carrier signal, the first switching amplifier further comprising:
    a first inductor with its first end connected to Vdd;
    a capacitor with its first end connected to a second end of the first inductor;
    a second inductor with its first end connected to a second end of the capacitor and its second end connected to the output audio modulated RF signal; and
    an N-type enhancement mode, metal oxide field effect transistor (MOSFET) having gate in communication with the carrier signal, a drain connected to the second end of the first inductor and the first end of the capacitor and source connected to GND;
  a phase-shifter configured to receive the carrier signal and an input audio signal, the phase-shifter further configured to phase-shift the carrier signal by the audio signal;

a second switching amplifier configured to amplify the audio phase-shifted carrier signal received from the phase-shifter; and a RF low pass filter configured to pass a combination of the amplified carrier signal and the audio phase-shifted carrier signal as an output audio modulated RF signal.

13. The communications system according to claim 12, further comprising an antenna configured for transmitting the output audio modulated RF signal.

14. The communications system according to claim 12, further comprising an amplitude modulating receiver configured for receiving the output audio modulated RF signal.

15. The communications system according to claim 12, further comprising a full wave rectifier in series with a speaker configured for transmitting the output audio modulated RF signal as sound waves.

16. The communications system according to claim 12, wherein each of the first and the second switching amplifiers are matched dual transistor amplifier circuits.

17. The communications system according to claim 12, wherein the second switching amplifier further comprises:
    a first inductor with its first end connected to Vdd;
    a capacitor with its first end connected to a second end of the first inductor;
    a second inductor with its first end connected to a second end of the capacitor and its second end connected to the output audio modulated RF signal; and
    an N-type enhancement mode, metal oxide field effect transistor (MOSFET) having gate in communication with the audio phase-shifted carrier signal received from the phase-shifter, a drain connected to the second end of the first inductor and the first end of the capacitor and source connected to GND.

18. A high fidelity non-pulse width modulation communications system for audio signal transmission, comprising:
    a radio frequency (RF) source for generating a carrier signal;
    a first switching amplifier configured to receive the carrier signal and generate an amplified carrier signal;
    a phase-shifter configured to receive the carrier signal and an input audio signal, the phase-shifter further configured to phase-shift the carrier signal by the audio signal;
    a second switching amplifier configured to amplify the audio phase-shifted carrier signal received from the phase-shifter, the second switching amplifier further comprising:
        a P-type enhancement mode, metal oxide field effect transistor (MOSFET) having gate in communication with the audio phase-shifted carrier signal received from the phase-shifter, a drain connected to Vdd and source connected to GND;
        an N-type enhancement mode, MOSFET having gate in communication with the audio phase-shifted carrier signal received from the phase-shifter, a drain connected to GND and a source connected to −Vdd;
        a first inductor connected between the P-type MOSFET source and the output audio modulated RF signal; and
        a second inductor connected between the N-type MOSFET source and the output audio modulated RF signal; and
    a RF low pass filter configured to pass a combination of the amplified carrier signal and the audio phase-shifted carrier signal as an output audio modulated RF signal.

19. The communications system according to claim 18, further comprising an antenna configured for transmitting the output audio modulated RF signal.

20. The communications system according to claim 18, further comprising an amplitude modulating receiver configured for receiving the output audio modulated RF signal.

21. The communications system according to claim 18, further comprising a full wave rectifier in series with a speaker configured for transmitting the output audio modulated RF signal as sound waves.

22. The communications system according to claim 18, wherein each of the first and the second switching amplifiers are matched dual transistor amplifier circuits.

23. The communications system according to claim 18, wherein the first switching amplifier further comprises:
    an inductor with a first end and a second end, wherein the second end is connected to the output audio modulated RF signal;
    a P-type enhancement mode, metal oxide field effect transistor (MOSFET) having gate in communication with the carrier signal received from the RF source, a source connected to Vdd and a drain connected to the first end of the inductor; and
    an N-type enhancement mode, MOSFET having gate in communication with the carrier signal, a drain connected to the first end of the inductor and a source connected to −Vdd.

24. A high fidelity non-pulse width modulation communications system for audio signal transmission, comprising:
    a radio frequency (RF) source for generating a carrier signal;
    a first switching amplifier configured to receive the carrier signal and generate an amplified carrier signal;
    a phase-shifter configured to receive the carrier signal and an input audio signal, the phase-shifter further configured to phase-shift the carrier signal by the audio signal;
    a second switching amplifier configured to amplify the audio phase-shifted carrier signal received from the phase-shifter, the second switching amplifier further comprising:
        a first inductor with its first end connected to Vdd;
        a capacitor with its first end connected to a second end of the first inductor;
        a second inductor with its first end connected to a second end of the capacitor and its second end connected to the output audio modulated RF signal; and
        an N-type enhancement mode, metal oxide field effect transistor (MOSFET) having gate in communication with the audio phase-shifted carrier signal received from the phase-shifter, a drain connected to the second end of the first inductor and the first end of the capacitor and source connected to GND; and
    a RF low pass filter configured to pass a combination of the amplified carrier signal and the audio phase-shifted carrier signal as an output audio modulated RF signal.

25. The communications system according to claim 24, further comprising an antenna configured for transmitting the output audio modulated RF signal.

26. The communications system according to claim 24, further comprising an amplitude modulating receiver configured for receiving the output audio modulated RF signal.

27. The communications system according to claim 24, further comprising a full wave rectifier in series with a speaker configured for transmitting the output audio modulated RF signal as sound waves.

28. The communications system according to claim 24, wherein each of the first and the second switching amplifiers are matched dual transistor amplifier circuits.

29. The communications system according to claim 24, wherein the first switching amplifier further comprises:
- a first inductor with its first end connected to Vdd;
- a capacitor with its first end connected to a second end of the first inductor;
- a second inductor with its first end connected to a second end of the capacitor and its second end connected to the output audio modulated RF signal; and
- an N-type enhancement mode, metal oxide field effect transistor (MOSFET) having gate in communication with the carrier signal, a drain connected to the second end of the first inductor and the first end of the capacitor and source connected to GND.

* * * * *